Sept. 18, 1956 K. SAHLE 2,763,425
COMPRESSOR UNLOADER
Filed June 9, 1955
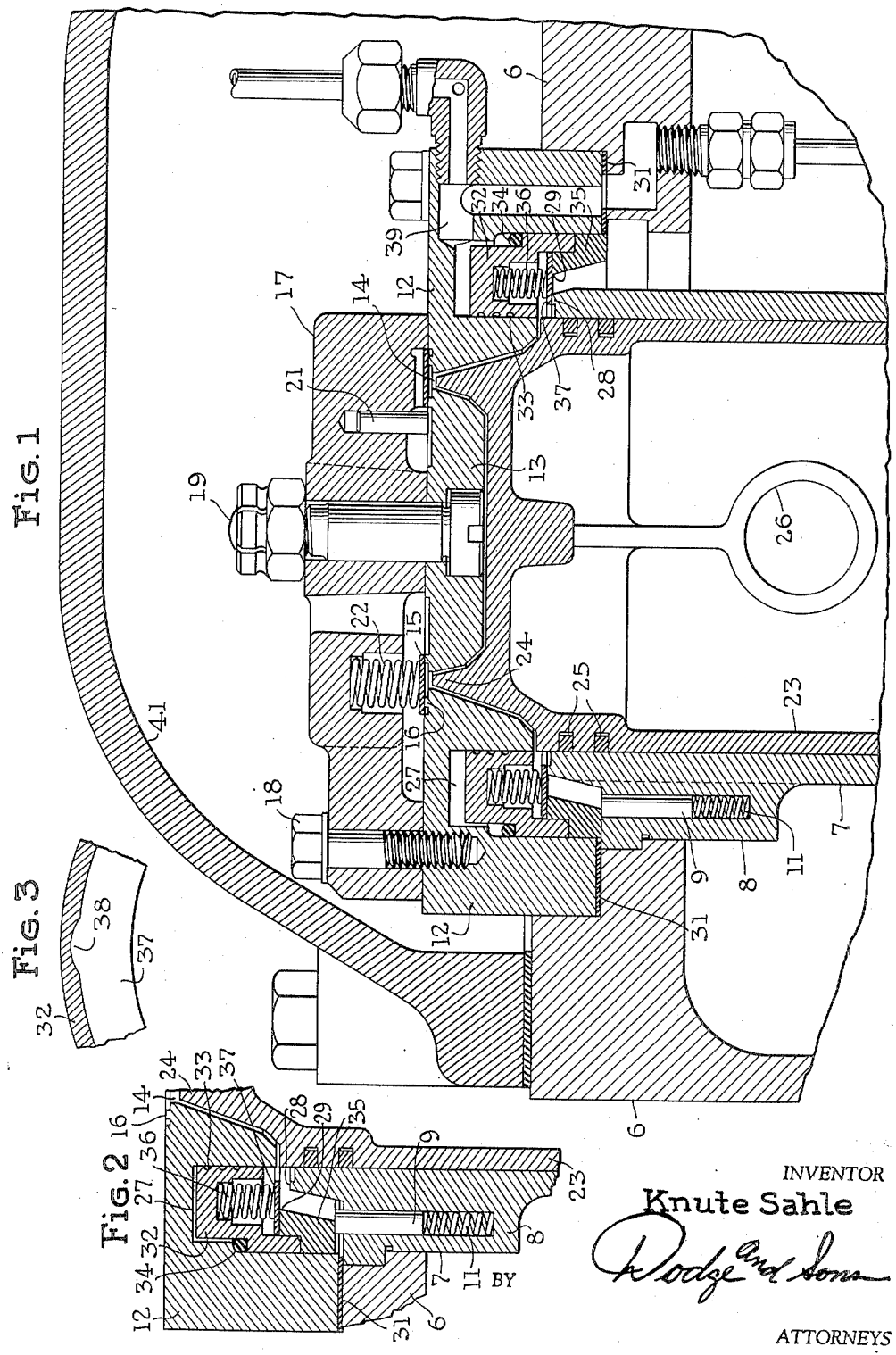
INVENTOR
Knute Sahle
BY Dodge and Sons
ATTORNEYS

United States Patent Office 2,763,425
Patented Sept. 18, 1956

2,763,425

COMPRESSOR UNLOADER

Knute Sahle, York, Pa., assignor, by mesne assignments, to Borg-Warner Corporation, Chicago, Ill., a corporation of Illinois Application June 9, 1955, Serial No. 514,270

5 Claims. (Cl. 230—30)

This invention relates to unloaders or capacity controls for compressors. One of the most satisfactory controls operates by holding the inlet valve away from its seat, the valve being a thin metal annulus which encircles the cylinder bore and coacts with an annular valve seat.

The usual prior art practice is to provide a plurality of plungers parallel with the cylinder axis and guided through guideways adjacent the valve seat. These plungers can be protruded simultaneously to engage the valve annulus and hold it away from its seat. Various arrangements for actuating the plungers have been used and these commonly involve fluid pressure actuation, the pressure fluid commonly being gas from the compressor discharge, with a pressure responsive control, or a control effected by the flow of lubricating oil.

One objection to this scheme is that the plungers engage the relatively light and flexible valve at a number of spaced points. The action is likely to cause wear and damage to the valve.

Another objection is that the unloading lift of the valve is the same as the inlet lift, whereas it should be greater, for best effect.

The present invention is directed to the control of the inlet valve to prevent or delay its closure.

According to the invention the inlet valve seat is divided into two concentric annular seat surfaces separated by the annular inlet port. One seat surface is fixed and the other is movable in the direction of the cylinder axis to a position in which it prevents the valve from seating on the fixed annular seat surface.

In the preferred construction, the fixed valve seat surface is on the end of the cylinder bushing and the movable valve seat surface is on a combined ring and piston coaxial with the cylinder, shiftable in the direction of the cylinder axis, and spring biased to unloading position. It may be forced to loading position, in which the two valve seat surfaces are coplanar, by fluid pressure developed behind the ring in a guiding cylinder. A stop shoulder defines the loading position of the combined ring and piston and a stop on the combined ring and piston limits the normal lift of the valve.

The valve is biased to close by springs reacting between it and the combined ring and piston, and the stop on the latter fixes a preferred normal valve-lift. Motion of the combined ring and piston to unloading position increases the lift of the valve, so that a desirably large unloading path is afforded. This improves the unloading action and lessens the shocks sometimes caused by the entrance into the compressor cylinder of slugs of liquid.

The invention resides in the mechanics of the combined inlet and unloading valve. The unloader is preferably actuated by a fluid pressure motor, but could be actuated by other known mechanisms. The control system for the unloader actuator may embody any known system (of which there are many) and will not be described since it is not a part of the claimed invention.

A preferred embodiment of the invention will now be described by reference to the accompanying drawing, in which:

Fig. 1 is a fragmentary axial section through a cylinder of a single-acting compressor, with the piston at the head-end dead-point and the unloading valve in its loading position.

Fig. 2 is a fragmentary section similar to a portion of Fig. 1 but showing a portion of the unloading valve in its unloading position.

Fig. 3 is a fragmentary view on a plane transverse to the cylinder axis showing means to prevent rotary shift of the inlet valve on its seat.

The drawings are based on a multi-cylinder compressor, but only parts having to do with the combined inlet and unloading valve for one cylinder are shown.

The cylinder housing appears at 6 and this is machined to receive the cylinder bushing 7 which has at intervals around the periphery of its upper end a plurality of longitudinally elongated bosses 8 which are bored to receive plungers 9. The plungers are urged upward by coil compression springs 11. Only one such boss with plunger is on the plane of section but five or six are used in a small compressor and more in large ones. These spring-urged plungers bias the valve unit toward unloading position as will later appear.

The cylinder head comprises a peripheral portion 12 (which is held to housing 6 by studs not visible in the drawing) and a central disc 13. The parts 12 and 13 define between them the circular discharge port 14. The flexible circular discharge valve 15 seats on rims 16 at opposite sides of the port 14 and is confined and guided by cage 17. The cage 17 also connects the parts 12 and 13 and holds them rigidly spaced. Machine screws, one of which appears at 18, connect the cage to peripheral portion 12 of the head. A center bolt 19 and dowel 21 sustain the disc 13 from the cage. The valve is seated by coil compression springs 22 which react between the valve and cage.

No novelty is here claimed for the cylinder head and exhaust valve construction.

The piston 23 is of the trunk type and works in cylinder bushing 7. The piston has a rim 24 on its head to reduce the clearance otherwise created by the discharge port. The piston carries conventional rings 25. The seat for the wrist pin is shown at 26 but the pin and connecting rod are not illustrated, being of usual form.

The head portion 12 is formed with a downwardly presented channel 27 coaxial with the cylinder bushing and immediately above the upper end of bushing 7. The upper end of bushing 7 carries the inner annular portion 28 of the inlet valve seat. This is a narrow plane surface normal to the cylinder axis, as is also the outer annular portion 29 of the inlet valve seat. The two are coplanar in the loaded position shown in Fig. 1.

The part 31 is a gasket which seals the head portion 12 to housing 6.

The outer annular portion of the inlet valve seat is carried by an annular piston 32 which works in the channel 27. This has a labyrinth packing comprising grooves 33 on its inner cylindrical face. The outer face is sealed by a rolling ring 34 of synthetic plastic. The seat surface 29 is formed on a ring 35 formed separately from annular piston 32 and connected therewith by a sliding fit. This construction facilitates assembly of annular piston 32, valve springs 36 (which are housed in pockets in the annular piston) and valve ring 37. It is necessary that the annular piston 32 be movable on the ring 35 to prevent the development of abnormal pressure which might otherwise result from slugs of liquid being admitted to the compressor. The upward movement of the annular piston 32 relatively to the ring 35 is limited so that its dependent skirt or flange is always engaged in the annular groove formed in the upper periphery of the ring 35. In this way proper alinement between the piston 32 and the ring 35 is assured at all times.

Rotation of valve 37 relatively to its seat is prevented by lug 38 which engages loosely in a notch in part 32.

The passage 39 typifies any connection through which any preferred pressure fluid is admitted to and exhausted from the control space in channel 27 above annular piston 32. The means controlling such admission and exhaust may take any preferred form and is not a part of the claimed invention. Many means adaptable to this purpose are available in the prior art. When the control space is exhausted the springs 11 move ring 32 to its upper position shown in Fig. 2 and the inlet valve is held open. This unloads the compressor. When the control space is under pressure the annular piston 32 moves downward to its limit of motion and loads the compressor by permitting the inlet valve to function normally.

It will be noted in the illustrated embodiment that the area of the upper face of the annular piston 32 which is subject to the pressure in the passage 39, is larger than the area of the lower annular face of the piston 32, which face is subject to the pressure in the compressor cylinder. In the preferred embodiment the pressure in the passage 39 is compressor discharge pressure and the relative areas of the upper and lower faces of the piston 32 which are subject to pressure are selected so that there is a dominant pressure bias which urges the piston 32 into contact with the ring 35 at all times. When other sources of pressure are used in the connection 39, it will be necessary to modify the areas of the exposed upper and lower faces of the piston 32 to assure the existence of this dominant bias. This dominant bias prevents chattering which might otherwise occur between the piston 32 and the ring 35, as the pressure above the inlet valve 37 varies during reciprocation of piston 23.

It should be observed that the unoloading lift of valve 37 markedly exceeds its normal lift.

The cover 41 bolted to housing 6 is simply a discharge manifold which receives compressed gas from the illustrated cylinder and another or others in the same bank.

The illustrated embodiment is intended as exemplary and no necessary limitation to the specific construction is implied.

What is claimed is:

1. A compressor with combined inlet and unloading valve mechanism comprising a reciprocable piston; a cylinder sleeve in which the piston is reciprocable, the sleeve and piston enclosing a compressor working space, said sleeve affording an annular inlet to the working space and adjacent thereto an annular seat surface normal to the cylinder axis; a ring coaxially encircling said sleeve, guided to move axially relatively thereto and spaced therefrom to define an inlet passage leading to said annular inlet, said ring having a complementary annular seat surface also normal to the cylinder axis; an annular valve capable of seating on both said seat surfaces to close said inlet passage; and means for shifting said ring between two positions, in the first of which the complementary annular seat surface is in plane with the seat surface on the sleeve, so that the valve can seat on both seat surfaces simultaneously, and in the second of which one of said seat surfaces is displaced in the direction of the cylinder axis and holds the valve out of contact with the other seat surface.

2. The combination defined in claim 1 in which the seat surface on the ring holds the valve away from the sleeve carried seat surface when in said second position.

3. The combination defined in claim 1 in which the ring includes stop means which alone limit the relative opening movement of the valve, and in said second position the seat surface on the ring holds the valve away from the sleeve-carried seat surface.

4. The structure defined in claim 3 in which the ring supports spring means which react between the ring and valve and bias the valve toward the seat surface on the ring.

5. The combination with the structure of claim 3 of means affording a motor working space with which the ring functions as a piston; spring means biasing the ring toward the second position; and connections for establishing a variable fluid pressure in said motor working space, opposing said bias.

References Cited in the file of this patent

UNITED STATES PATENTS

| | | |
|---|---|---|
| 1,489,912 | Winkler | Apr. 8, 1924 |
| 2,462,039 | Gibson | Feb. 15, 1949 |
| 2,673,025 | Labus et al. | Mar. 23, 1954 |